United States Patent
French et al.

(10) Patent No.: US 9,766,128 B1
(45) Date of Patent: Sep. 19, 2017

(54) SPECTRAL FILTER

(75) Inventors: Herbert A. French, Emsworth (GB); Philip Sutton, Chandler's Ford (GB)

(73) Assignee: QINETIQ LIMITED, Farnborough (GB)

( * ) Notice: Subject to any disclaimer, the term of this patent is extended or adjusted under 35 U.S.C. 154(b) by 0 days.

(21) Appl. No.: 07/220,697

(22) Filed: Jul. 6, 1988

(30) Foreign Application Priority Data

Jul. 10, 1987 (GB) .................................. 8716290

(51) Int. Cl.
  *G02B 27/46* (2006.01)
  *G01J 3/45* (2006.01)
  *G01J 9/00* (2006.01)

(52) U.S. Cl.
  CPC .. *G01J 3/45* (2013.01); *G01J 9/00* (2013.01)

(58) Field of Classification Search
  CPC ...................................... G01J 3/45; G01J 9/00
  USPC ............... 359/559; 356/316, 162.12, 162.15, 356/162.19, 345, 346
  See application file for complete search history.

(56) References Cited

U.S. PATENT DOCUMENTS 3,240,108 A * 3/1966 Lehan et al. ................... 356/316
3,890,598 A * 6/1975 Hagen et al. .................. 356/346
4,722,604 A * 2/1988 French et al. ................. 356/345

FOREIGN PATENT DOCUMENTS

| GB | 1595587 | * | 8/1981 |
| GB | 2144847 | * | 3/1985 |
| GB | 2144848 | * | 3/1985 |

* cited by examiner

*Primary Examiner* — Mark Hellner
(74) *Attorney, Agent, or Firm* — Nixon & Vanderhye P.C.

(57) ABSTRACT

A filter for removing coherent radiation from a source in a field of view, substantially independent of the size of the source, comprises a first reticle 22 located in the path of received light 21, a first lens 23 producing an optical transform of the first reticle 22 at a second reticle 24 located in the image plane of the first lens 23, a second lens 25 producing an optical transform of the second reticle 24 and a third reticle 26 located in the image plane of the second lens 25. The arrangement is such that the spatial transmittance of the third reticle 26 is selected to block at least part of the diffracted image of the first reticle 22 produced in the image plane of the second lens 25 and characteristic of the coherent radiation. Preferably the optical transforms are Fourier Transforms. A monochromatic coherent source in the field of view produces a pattern of diffracted energy in the image plane of the second lens which is independent of the size of the source. Thus, by providing a suitable reticle 26 in the image plane of the second lens light from a coherent source in the field of view can be blocked while polychromatic light is transmitted. The first and second reticles may be periodic picket-fence reticles or different spatial frequencies may be used for the first and third reticles so as to vary the stop-band characteristics of the filter.

12 Claims, 5 Drawing Sheets

FIRST ORDER -ve    ZERO ORDER    FIRST ORDER +ve

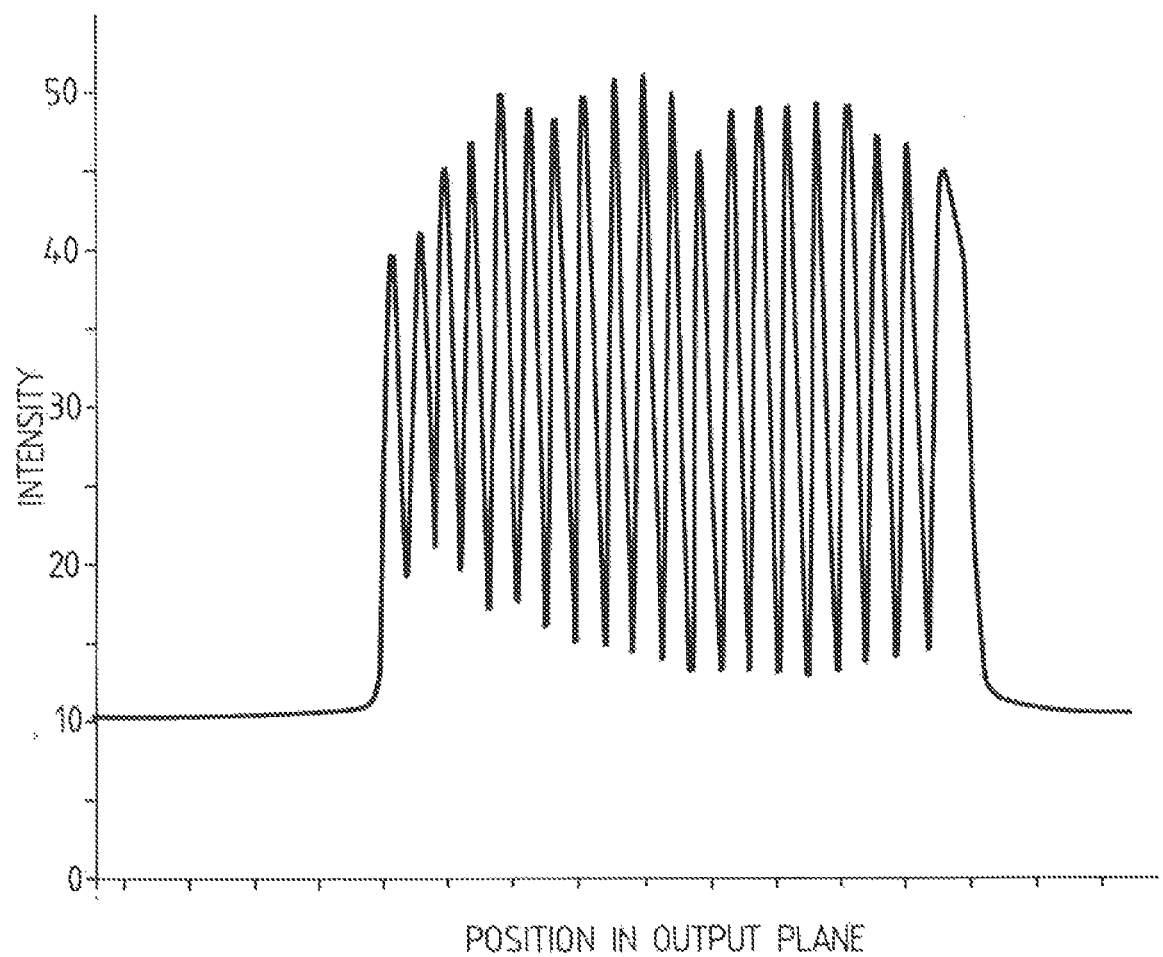

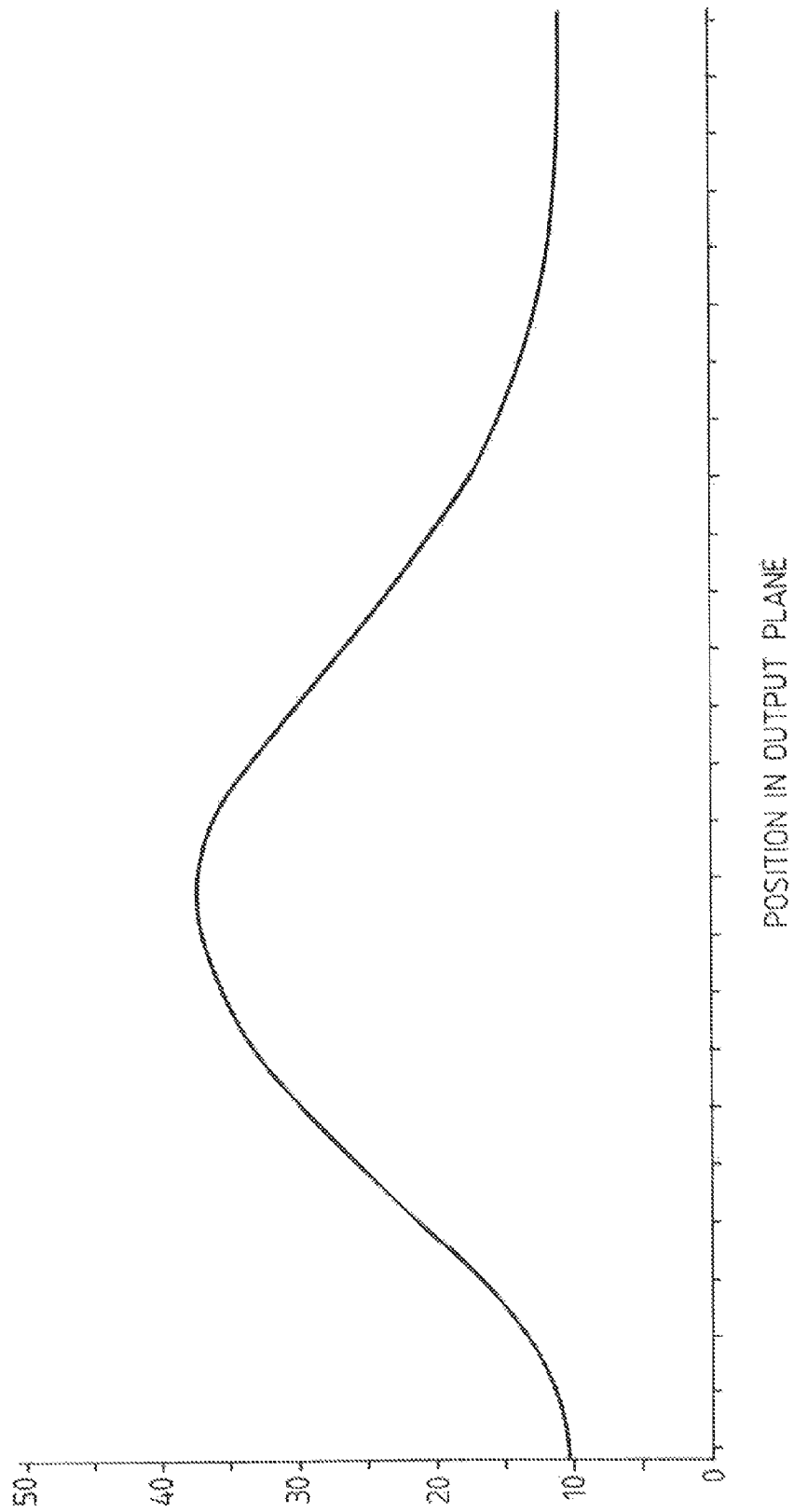

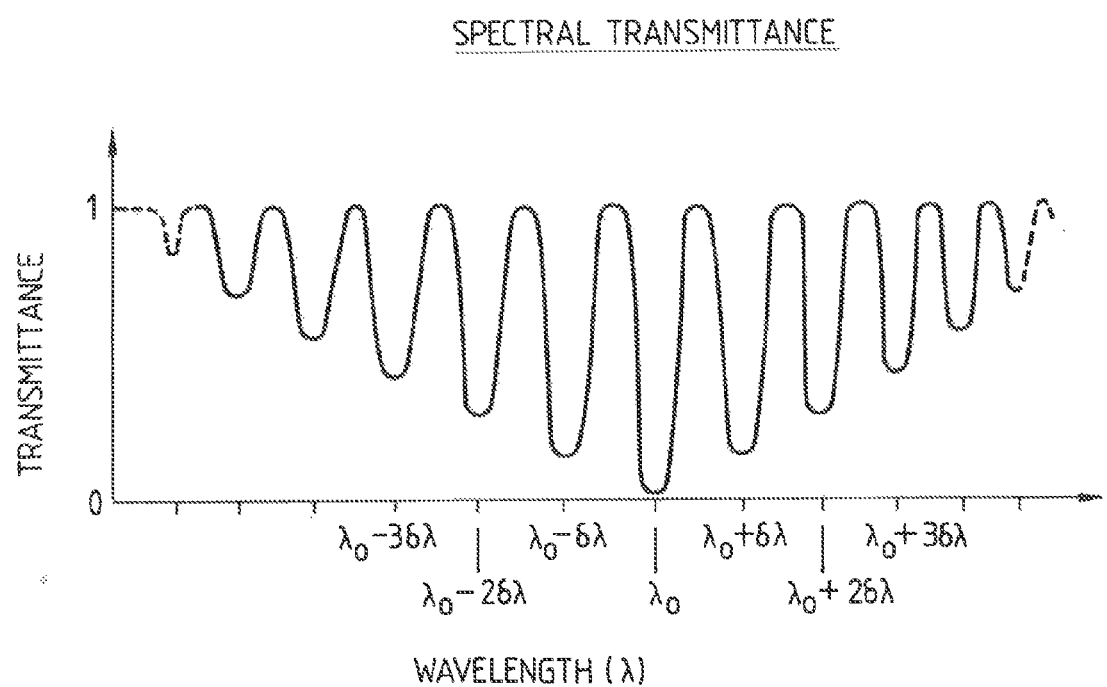

SPECTRAL FILTER

The invention relates to the filtering of electro-magnetic radiation and in particular to filtering out coherent or partially coherent radiation from a field of view.

Detection systems operating in the electro-magnetic spectrum may be blinded or damaged by high intensity coherent radiation within the spectral passband of such systems. Such radiation might emanate from a point source, for example a laser, within the field of view or from a spatially extensive object reflecting the radiation. Where high intensity coherent radiation is emitted from a known point source means may be provided in the path of such radiation to prevent blinding or damage to eyesight or radiation detector. Coherent radiation is commonly monochromatic and therefore a stop-band filter may also be used to remove such radiation. Efficient narrow-band stop-filters are, however, difficult to produce.

The object of the present invention is to provide a filter for removing coherent radiation from a source in a field of view which is substantially independent of the size of the source.

The invention provides a filter for discriminating against coherent radiation in a field of view comprising: means to receive light from a field of view;
a first reticle located in the path of the received light;
a first lens producing an optical transform of the first reticle at an image plane;
a second reticle located in the image plane of the first lens;
a second lens producing an optical transform of the second reticle in an image plane; and
a third reticle located in the image plane of the second lens; the arrangement being such that the spatial transmittance of the third reticle is selected to block at least part of the diffracted image of the first reticle produced in the image plane of the second lens and characteristic of the coherent radiation. Preferably the optical transforms are Fourier Transforms. The optical transforms may alternatively be Abel or Hankel transformations and not necessarily identical.

A monochromatic coherent source in the field of view produces a pattern of diffracted energy in the image plane of the second lens, the distribution of diffracted energy being independent of the size of the source. A polychromatic source, however, does not produce higher order fringe patterns. Thus, by providing a suitable reticle in the image plane of the second lens light from a coherent source in the field of view can be blocked while polychromatic light is transmitted. The invention can also operate over a wide field of view.

In one arrangement the first and second reticles may be periodic picket-fence reticles. Non-constant and mutually different spatial frequencies may be used for the first and third reticles so as to vary the stop-band characteristics of the filter. The spatial frequencies may be chirped, i.e. spatial f.m. The reticles may be transmission or reflection reticles or a combination thereof.

In an alternative arrangement the first and third reticles are phase reticles.

The invention will now be described by way of example only with reference to the accompanying Drawings of which:

FIG. 7 is a graph of the measured variation of intensity with position in the first order for an extended argon laser source;

FIG. 8 is a similar graph to FIG. 7 for the background without the laser source; and FIG. 9 is a graph of the transmittance of the system.

Figure 1:
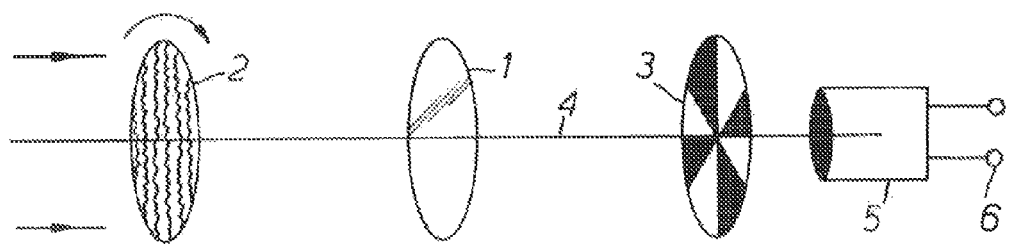
FIG. 1 illustrates a known detection system illustrating use of a Fourier transforming lens.

FIG. 1 shows a detector system incorporating a Fourier transforming lens 1 as described in UK Patent No. 1595587. Spatial coherence and spectral information present in the light from a target are processed so as to selectively modulate the target while leaving the background unmodulated. Light from a field of view, including the target, is incident on an aperture plane picket-fence reticle 2. The lens 1 produces a Fourier transform of the reticle 2 in the back focal plane of the lens 1. A second stationary sectored reticle 3 is positioned in the back focal plane of the lens 1. Light from the target is Fourier transformed to produce a spatial intensity variation across the stationary reticle 3 which is not circularly symmetrical about the optical axis 4 whereby, on rotation of the aperture plane reticle 2, the target light is modulated by the stationary reticle. Background light, however, which does not have the same spatial coherence and spectral properties as a laser target, for example, is not modulated. Thus a detector 5 behind the stationary reticle 3 can identify the desired target by the presence of a specific modulation of the electrical output signal 6. This type of detector system is very successful in separating wanted signals from background clutter.

Figure 2:
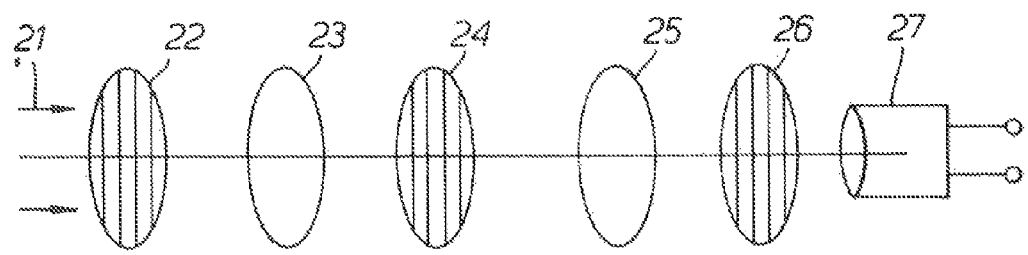
FIG. 2 shows a target-size invariant spectral filter according to the invention.

FIG. 2 shows a spectral stop-band filter according to the invention. Incident light 21 is transmitted by a first aperture plane picket-fence reticle 22. A first Fourier transforming lens 23 produces a Fourier transform of the reticle 22 in the back focal plane of the lens where a second picket-fence reticle 24 is located. A Fourier transform (FT) of the product of the FT of the reticle 22 with the second reticle 24 is produced in the back focal plane of a second lens 25 where a third picket-fence reticle 26 is located. A detector 27 receives light transmitted by the three reticles and two lenses.

Figure 3:
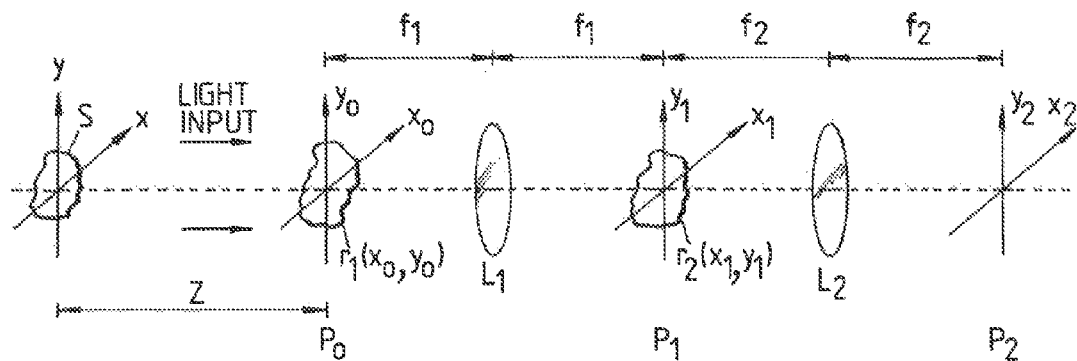
FIG. 3 illustrates the parameters used in analysing the performance of the filter.

Operation of the invention will be described with reference to FIG. 3 which shows an input aperture plane $P_0$ illuminated by a distant coherent source 'S' in the x-y plane. The first reticle $r_1$ $(x_0, y_0)$ is placed in the plane $P_0$ perpendicular to the optical (z) axis. The Fourier transform $$R_1\left(\frac{x_1}{\lambda f_1}, \frac{y_1}{\lambda f_1}\right)$$

is formed at the back focal plane of the first lens $L_1$ at plane $P_1$; where $x_1$, $y_1$ are the x-y coordinates in the $P_1$ plane, $f_1$ is the focal length of lens $L_1$, and $\lambda$ is the wavelength.

The second reticle $r_2$ $(x_1 y_1)$ is placed in the $P_1$ plane. Consequently the function appearing at the $P_1$ plane is now given by:

$$P_1(x_1, y_1) = K_1\left\{S\left(\frac{x_1 f_1}{z}, \frac{y_1 f_1}{z}\right) * R_1\left(\frac{x_1}{\lambda f_1}, \frac{y_1}{\lambda f_1}\right) x r_2(x_1, y_1)\right\} \quad (1)$$

The further transformation by lens $L_2$ forms the function at plane $P_2$:

$$P_2(x_2, y_2) = \quad (2)$$
$$K_2\left\{\left[S\left(\frac{-x_2 f_1}{f_2}, \frac{-y_2 f_1}{f_2}\right) x r_1\left(\frac{-x_2 f_1}{f_2}, \frac{-y_2 f_1}{f_2}\right)\right] * R_2\left(\frac{x_2}{\lambda f_2}, \frac{y_2}{\lambda f_2}\right)\right\}$$

where * denotes convolution and $K_2$ is a constant.

Figure 4:
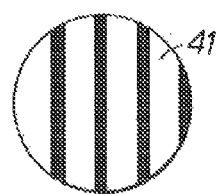
FIG. 4 shows a reticle used at planes $P_0$ and $P_1$ in FIG. 3.
Figure 5:
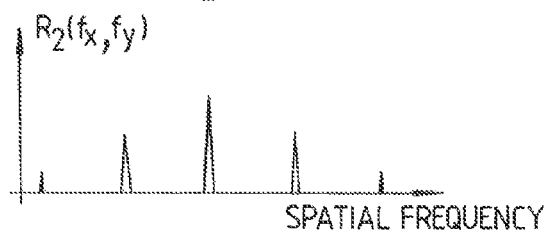
FIG. 5 is a graphical representation of the Fourier transformation of one of the reticles in the filter.
Figure 6:
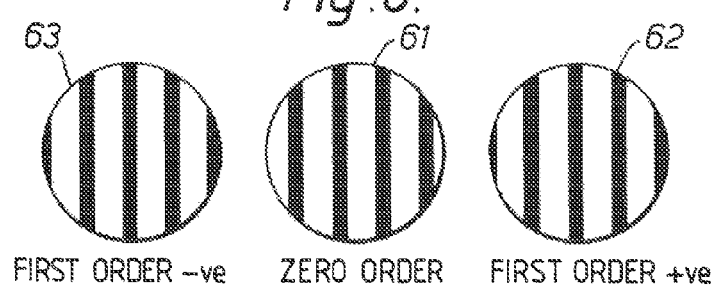
FIG. 6 illustrates the zero and first orders (positive and negative) of the diffraction pattern in the output plane $P_2$ of the filter.

Referring now to FIGS. 4-6. If the reticles $r_1$ and $r_2$ (22,24) are as indicated by 41, the intensity distribution $I_2$ ($x_2,y_2$) in the output plane $P_2$ is as shown in FIG. 6. The zero order 61 and first orders (62 and 63) are each replicas of the reticle 41. This is evident from equation (2) where it can be seen that the output is a convolution between an inverted $r_1$ and $R_2$, the Fourier transform of $r_2$, which is shown in FIG. 5.

The output as sketched in FIG. 6 is independent of the size of the coherent source S, as can be appreciated if it is noted that the output function at $P_2$ is effectively an image of the reticle at $P_0$, and replicated by the action of $r_2$. This is expressed in equation (2) where $S(mx_2,my_2)$ represents the coherent signal at the system input plane $P_0$ (where $m=-f_1/f_2$ the ratio of the focal lengths of lenses $L_1$ and $L_2$).

The reticle 26 in the output plane $P_2$ of the filter is thus arranged to block the target-size invariant first order diffraction image. By this means the filter will block light from any coherent source, at the design wavelength, irrespective of the angular size of the target in the field of view, while allowing transmission of other light.

For perfectly incoherent illumination the system is a linear mapping of intensity such that for the incoherent spectral component at wavelength $\lambda$, the intensity output at the [$x_2,y_2$] plane is given by:

$$P_2'(x_2, y_2, \lambda) = K_2'\left\{|S(mx_2, my_2)|^2 x |r_1(mx_2, my_2)|^2 * \left|R_2\left(\frac{x_2}{\lambda f_2}, \frac{y_2}{\lambda f_2}\right)\right|^2\right\} \quad (3)$$

If the background has a spectral profile $I_b(\lambda)$, then the actual intensity profile (assuming the optical components have unity transmittance over the spectral pass-band of interest) is given by:

$$P_2'(x_2, y_2,) = \int_0^\infty I_b(\lambda) \cdot P_2'(x_2, y_2, \lambda) d\lambda \quad (4)$$

As with the coherent case, size-invariant operation occurs.

From equations (3) and (4) it can be seen that the positions of the positive and negative first orders is a linear function of the wavelength $\lambda$, because the argument of $R_2$ is an inverse function of $\lambda$. Hence a polychromatic source leads to a spatial "whitening" of the positive and negative first orders.

FIGS. 7 and 8 show the different responses of the system to partially coherent and incoherent illumination with reticle 26 removed. FIG. 7 shows the first diffraction-order response of an experimental system where the source is a far-field screen illuminated by an argon-ion laser (514 mm), and the angular subtense of the laser "source" was approximately 5 degrees. The sensor's field-of-view was 25 degrees. The "pattern", that is, the image of the reticle $r_1$, is clearly visible and it should be noted that a similar result was obtained for a laser "point-source". FIG. 8 shows the output from the same system when pointed at an incoherent scene. The results obtained in FIGS. 7 and 8 were obtained by scanning the first-order diffraction pattern in the output plane with a narrow slit which was placed in front of a photomultiplier detector. While the spatial frequency of the intensity variation shown in FIG. 7 is wavelength independent, its location in the output plane is dependent on the wavelength of the coherent radiation. Thus for regular periodic reticles the filter has a narrow stop-band.

The second reticle $r_2$ may be a phase reticle (thereby effectively removing the zero order from the $P_2$ plane and increasing the through-put of the optical system) and which can effectively generate a single higher-order (ie a positive or negative first-order only). Furthermore, as noted above, the signal energy can be used more efficiently by employing reflecting reticles, so that the total energy can be processed in a "parallel" system at two output planes, and more advanced arrangements using acoustic-optic cell modulators can be envisaged.

The function $R_2$ (Equation 2 and FIG. 5) is in effect a series of Dirac data functions at positions of the positive and negative first orders; that is at:

$$\pm \lambda f_2 / L$$

where L is the periodicity (ie the line spacing per unit length) of reticle $r_2$. Thus from equation (2), (3) and (4) the transmission $T(\lambda)$ through the reticle $r_3$ (26), placed at the location of one of the orders the first orders corresponding to $R_2$, is given by:

$$T(\lambda) = \int_{-\infty}^{+\infty} \int_{X1}^{X2} I_b(\lambda) \left| r_1\left(mx_2 - \frac{\lambda f_2}{L}, my_2\right) \right|^2 \cdot |r_3(x_2, y_2)|^2 \cdot dx_2 \, dy_2 \quad (5)$$

where $X_1$ and $X_2$ represent the limits in the $x_2$ plane over which the first order exists. For simplicity, constants which only affect the dimensional scaling have been omitted.

From equation (5) it can be seen that the spectral transmittance $T(\lambda)$ is in effect a convolution of the spectrally displayed $|r_1|^2$ with $|r_3|^2$. Hence, if the two reticles are simple picket-fence reticles (as indicated in FIG. 4) the spectral transmittance (assuming that $I_b(\lambda)$=constant=1) is given schematically as shown in FIG. 9. Note also that from equation 5 the absorption "dips" occur at $$\frac{\delta \lambda \cdot f_2}{L} = p \cdot |m| \quad (6)$$

where $m=-f_2/f_1$
and p=the pitch of the line spacing of reticle $r_1$.
Hence:

$$\delta \lambda = \frac{pL}{f_1} \quad (7)$$

The ideal stop-band spectral filter would have a single absorption "dip". Although careful selection of the pitch value p and the line periodicity 1 can lead to a relatively large $\delta \lambda$, the best approach may be to use non-constant and mutually different spatial-frequencies for reticles $r_1$ and $r_3$. That is, chirped (spatial f.m.) reticles may lead to a more ideal performance of the system.

Some applications require multi-line operation (eg laser protection spectacles for use against NdYAG, Ruby and frequency doubled NdYAG). Again, by careful selection of reticles $r_1$ and $r_3$ the desired filter characteristics may be possible.

It can be seen that the techniques are not limited to the visible and infra-red wavebands, or to using conventional optical components. The techniques are applicable to any part of the electromagnetic spectrum eg the millimetric region, provided that suitable components are available. Although the invention has been described with respect to a coherent laser light source, by correct selection of reticles the invention can be tailored to specific profiles and spectral bandwidths.

The successive transforms (by the lenses 23 and 25) are selected such that there is a double imaging property in which the original function or some version of it is produced (for example, phase conjugate or "upside down") enabling the output to be blocked correctly. Thus:

$T[T(r_1(x)] \rightarrow r_1(x)$ or $r_1^*(x)$ or $-[r_1(x)]$ or $r_1(-x)$ etc where T is a transform. The Fourier transforming lenses 23 and 25 satisfy this condition. More than two transformations may be applied, providing that the final output function is substantially related to the input function as described. Thus "cyclic" transforms such as Abel and Hankel may be used in addition to Fourier. The reticles may be transmission or reflection reticles and also the first and third reticles may be phase reticles.

We claim:

1. A bandstop filter for discriminating against coherent or partially coherent radiation in a field of view comprising:
   - a first reticle located in the path of light received from the field of view;
   - a first lens producing an optical transform of the first reticle at an image plane;
   - a second reticle located in the image plane of the first lens;
   - a second lens producing an optical transform of the second reticle in an image plane; and
   - a third reticle located in the image plane of the second lens; the arrangement being such that the spatial transmittance of the third reticle is selected to block at least part of the diffracted image of the first reticle produced in the image plane of the second lens and characteristic of the coherent radiation.

2. A bandstop filter as claimed in claim 1 wherein at least one of the optical transforms is a Fourier Transform.

3. A bandstop filter as claimed in claim 2 wherein the optical transforms are identical.

4. A bandstop filter as claimed in claim 3 wherein the first and second reticles are periodic picket-fence reticles.

5. A bandstop filter as claimed in claim 4 wherein non-constant and mutually different spatial frequencies are used for the first and third reticles so as to vary the stop-band characteristics of the filter.

6. A bandstop filter as claimed in claim 5 wherein the spatial frequencies are chirped.

7. A bandstop filter as claimed in claim 1 wherein the first and second reticles are periodic picket-fence reticles.

8. A bandstop filter as claimed in claim 7 wherein non-constant and mutually different spatial frequencies are used for the first and third reticles so as to vary the stop-band characteristics of the filter.

9. A bandstop filter as claimed in claim 8 wherein the spatial frequencies are chirped.

10. A bandstop filter as claimed in claim 2 wherein the first and second reticles are periodic picket-fence reticles.

11. A bandstop filter as claimed in claim 10 wherein non-constant and mutually different spatial frequencies are used for the first and third reticles so as to vary the stop-band characteristics of the filter.

12. A bandstop filter as claimed in claim 11 wherein the spatial frequencies are chirped.

\* \* \* \* \*